US006621495B1

(12) United States Patent
Cook et al.

(10) Patent No.: US 6,621,495 B1
(45) Date of Patent: Sep. 16, 2003

(54) METHOD AND APPARATUS TO HANDLE IMMEDIATE MODE DATA STREAMS IN A DATA PROCESSING SYSTEM

(75) Inventors: Russell S. Cook, Round Rock, TX (US); Joe Christopher St. Clair, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 09/589,796

(22) Filed: Jun. 8, 2000

(51) Int. Cl.[7] ................................. G06T 1/20
(52) U.S. Cl. ................... 345/506; 345/620; 345/418
(58) Field of Search ........................... 345/501–506, 345/519–520, 522, 530–574, 418, 419, 426, 427, 582, 620

(56) References Cited

U.S. PATENT DOCUMENTS

| | | | | |
|---|---|---|---|---|
| 5,142,617 A | * | 8/1992 | Dalrymple et al. | 345/606 |
| 5,675,773 A | * | 10/1997 | Devic | 345/522 |
| 5,809,179 A | * | 9/1998 | Marimont et al. | 382/254 |
| 5,951,672 A | * | 9/1999 | Kwok et al. | 712/28 |
| 6,097,395 A | * | 8/2000 | Harris et al. | 345/426 |
| 6,417,858 B1 | * | 7/2002 | Bosch et al. | 345/522 |

OTHER PUBLICATIONS

The OpenGL Graphics System: A Specification (Version 1.2); Segal et al.; Mar. 23, 1998.

* cited by examiner

Primary Examiner—Kee M. Tung
(74) Attorney, Agent, or Firm—Duke W. Yee; Mark E. McBurney

(57) ABSTRACT

A method and apparatus in a geometry engine having a plurality of stages for processing graphics data. An immediate mode data stream is received at a first stage within the plurality of stages. Data from the immediate mode data stream is stored in a storage to build a vertex data structure for processing within the plurality of stages. The vertex data structure is transmitted to the first stage for processing in response to receiving a signal to transmit the vertex data structure. Data for the vertex data structure remains in the storage as default data for a subsequent vertex data structure.

27 Claims, 7 Drawing Sheets

| 0 | | | | | | | 7 | 8 | | | | | | | 15 | 16 | | |
|---|---|---|---|---|---|---|---|---|---|---|---|---|---|---|---|---|---|---|
| c | c | c | c | c | c | c | c | c | c | c | c | – | – | F | R | L | L | L |
| e | e | e | e | e | e | e | e | e | e | e | e | e | e | e | e | e | e | e |
| – | – | – | – | – | – | – | – | – | – | – | – | – | – | – | – | – | – | – |
| x | x | x | x | x | x | x | x | x | x | x | x | x | x | x | x | x | x | x |
| y | y | y | y | y | y | y | y | y | y | y | y | y | y | y | y | y | y | y |
| z | z | z | z | z | z | z | z | z | z | z | z | z | z | z | z | z | z | z |
| w | w | w | w | w | w | w | w | w | w | w | w | w | w | w | w | w | w | w |
| x | x | x | x | x | x | x | x | x | x | x | x | x | x | x | x | x | x | x |
| y | y | y | y | y | y | y | y | y | y | y | y | y | y | y | y | y | y | y |
| z | z | z | z | z | z | z | z | z | z | z | z | z | z | z | z | z | z | z |
| w | w | w | w | w | w | w | w | w | w | w | w | w | w | w | w | w | w | w |
| – | – | – | – | – | – | – | – | – | – | – | – | – | – | – | – | – | – | – |
| S | S | S | S | S | S | S | S | S | S | S | S | S | S | S | S | S | S | S |
| T | T | T | T | T | T | T | T | T | T | T | T | T | T | T | T | T | T | T |
| R | R | R | R | R | R | R | R | R | R | R | R | R | R | R | R | R | R | R |
| Q | Q | Q | Q | Q | Q | Q | Q | Q | Q | Q | Q | Q | Q | Q | Q | Q | Q | Q |
| S | S | S | S | S | S | S | S | S | S | S | S | S | S | S | S | S | S | S |
| T | T | T | T | T | T | T | T | T | T | T | T | T | T | T | T | T | T | T |
| R | R | R | R | R | R | R | R | R | R | R | R | R | R | R | R | R | R | R |
| Q | Q | Q | Q | Q | Q | Q | Q | Q | Q | Q | Q | Q | Q | Q | Q | Q | Q | Q |
| – | – | – | – | – | – | – | – | – | – | – | – | – | – | – | – | F | F | F |
| α | α | α | α | α | α | α | α | R | R | R | R | R | R | R | R | G | G | G |
| – | – | – | – | – | – | – | – | R | R | R | R | R | R | R | R | G | G | G |
| α | α | α | α | α | α | α | α | R | R | R | R | R | R | R | R | G | G | G |
| – | – | – | – | – | – | – | – | R | R | R | R | R | R | R | R | G | G | G |
| α | α | α | α | α | α | α | α | R | R | R | R | R | R | R | R | G | G | G |
| α | α | α | α | α | α | α | α | α | α | α | α | α | α | α | α | α | α | α |
| R | R | R | R | R | R | R | R | R | R | R | R | R | R | R | R | R | R | R |
| G | G | G | G | G | G | G | G | G | G | G | G | G | G | G | G | G | G | G |
| B | B | B | B | B | B | B | B | B | B | B | B | B | B | B | B | B | B | B |
| $N_x$ | $N_x$ | $N_x$ | $N_x$ | $N_x$ | $N_x$ | $N_x$ | $N_x$ | $N_x$ | $N_x$ | $N_x$ | $N_x$ | $N_x$ | $N_x$ | $N_x$ | $N_x$ | $N_x$ | $N_x$ | $N_x$ |
| $N_y$ | $N_y$ | $N_y$ | $N_y$ | $N_y$ | $N_y$ | $N_y$ | $N_y$ | $N_y$ | $N_y$ | $N_y$ | $N_y$ | $N_y$ | $N_y$ | $N_y$ | $N_y$ | $N_y$ | $N_y$ | $N_y$ |
| $N_z$ | $N_z$ | $N_z$ | $N_z$ | $N_z$ | $N_z$ | $N_z$ | $N_z$ | $N_z$ | $N_z$ | $N_z$ | $N_z$ | $N_z$ | $N_z$ | $N_z$ | $N_z$ | $N_z$ | $N_z$ | $N_z$ |
| – | – | – | – | – | – | – | – | R | R | R | R | R | R | R | R | G | G | G |

*FIG. 6A*

| | 23 | 24 | | | | | | | 31 | |
|---|---|---|---|---|---|---|---|---|---|---|
| L | L | L | L | L | L | L | L | L | L | L | COMMAND |
| e | e | e | e | e | e | e | e | e | e | e | 0 | efield |
| – | – | – | – | – | – | – | – | – | – | – | – | 31:reserved |
| x | x | x | x | x | x | x | x | x | x | x | x | 30:xcoordinate |
| y | y | y | y | y | y | y | y | y | y | y | y | 29:ycoordinate |
| z | z | z | z | z | z | z | z | z | z | z | z | 28:zcoordinate |
| w | w | w | w | w | w | w | w | w | w | w | w | 27:wcoordinate |
| x | x | x | x | x | x | x | x | x | x | x | x | 26:Auxiliaryxcoordinate |
| y | y | y | y | y | y | y | y | y | y | y | y | 25:Auxiliaryycoordinate |
| z | z | z | z | z | z | z | z | z | z | z | z | 24:Auxiliaryzcoordinate |
| w | w | w | w | w | w | w | w | w | w | w | w | 23:Auxiliarywcoordinate |
| – | – | – | – | – | – | – | – | – | – | – | f | 22:flag |
| S | S | S | S | S | S | S | S | S | S | S | S | 21:S0texturecoordinate |
| T | T | T | T | T | T | T | T | T | T | T | T | 20:T0texturecoordinate |
| R | R | R | R | R | R | R | R | R | R | R | R | 19:R0texturecoordinate |
| Q | Q | Q | Q | Q | Q | Q | Q | Q | Q | Q | Q | 18:Q0texturecoordinate |
| S | S | S | S | S | S | S | S | S | S | S | S | 17:S1texturecoordinate |
| T | T | T | T | T | T | T | T | T | T | T | T | 16:T1texturecoordinate |
| R | R | R | R | R | R | R | R | R | R | R | R | 15:R1texturecoordinate |
| Q | Q | Q | Q | Q | Q | Q | Q | Q | Q | Q | Q | 14:Q1texturecoordinate |
| F | F | F | F | F | F | F | F | F | F | F | F | 13:FogFactor |
| G | G | G | G | G | B | B | B | B | B | B | B | 12:FrontAmbient/Diffuse |
| G | G | G | G | G | B | B | B | B | B | B | B | 11:FrontSpecular |
| G | G | G | G | G | B | B | B | B | B | B | B | 10:BackAmbient/Diffuse |
| G | G | G | G | G | B | B | B | B | B | B | B | 9:BackSpecular |
| G | G | G | G | G | B | B | B | B | B | B | B | 8:PackedPrimaryCC |
| α | α | α | α | α | α | α | α | α | α | α | α | 7:UnpackedPrimaryCCAlpha |
| R | R | R | R | R | R | R | R | R | R | R | R | 6:UnpackedPrimaryCCRed |
| G | G | G | G | G | G | G | G | G | G | G | G | 5:UnpackedPrimaryCCGreen |
| B | B | B | B | B | B | B | B | B | B | B | B | 4:UnpackedPrimaryCCBlue |
| $N_x$ | $N_x$ | $N_x$ | $N_x$ | $N_x$ | $N_x$ | $N_x$ | $N_x$ | $N_x$ | $N_x$ | $N_x$ | $N_x$ | 3:NormalX |
| $N_y$ | $N_y$ | $N_y$ | $N_y$ | $N_y$ | $N_y$ | $N_y$ | $N_y$ | $N_y$ | $N_y$ | $N_y$ | $N_y$ | 2:NormalY |
| $N_z$ | $N_z$ | $N_z$ | $N_z$ | $N_z$ | $N_z$ | $N_z$ | $N_z$ | $N_z$ | $N_z$ | $N_z$ | $N_z$ | 1:NormalZ |
| G | G | G | G | G | B | B | B | B | B | B | B | 0:PackedSecondaryCC |

*FIG. 6B*

METHOD AND APPARATUS TO HANDLE IMMEDIATE MODE DATA STREAMS IN A DATA PROCESSING SYSTEM

BACKGROUND OF THE INVENTION

1. Technical Field

The present invention relates generally to an improved data processing system and in particular to a method and apparatus for processing graphics data. Still more particularly, the present invention provides a method and apparatus for handling immediate mode data streams.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, an arc, a cone, or a sphere. A primitive is defined by a group of one or more vertices. An attribute is used to define how a primitive will be displayed. Attributes include, for example, line style, color, and surface texture. A vertex defines a point, an end point of an edge, or a corner of a polygon where two edges meet. Data also is associated with a vertex in which the data includes information, such as positional coordinates, colors, normals, and texture coordinates. Commands are sent to the graphics system;to define how the primitives and other data should be processed for display.

With the large amounts of data and computations involved in processing graphics data, especially with three-dimensional applications, many of these computations have been offloaded from the central processing units to a graphics adapter. Within these graphics systems, a graphics pipeline located in the graphics adapter is used to process this graphics data. With a pipeline, the graphics data processing is partitioned into stages of processing elements in which processing data may be executed sequentially by separate processing elements.

Currently, an application executing on the host processor generates vertices and sends those vertices to the pipeline in the geometry engine for processing. This data, received by the geometry engine, is called a vertex array data stream. With the host processor handling immediate mode data streams, the data is often buffered or stored during processing, prior to sending the data containing the vertices to the geometry engine. It is desirable, however, to have the geometry engine perform additional functions, such as handling immediate mode data streams in rendering an object to reduce the load on the host processor and reduces the bus bandwidth required. Adding capability to handle immediate mode data streams, however, requires additional circuitry or stages in the pipeline of the geometry engine. This added capability increases the size and complexity of the geometry engine.

Therefore, it would be advantageous to have an improved method and apparatus for handling both vertex array data streams and immediate mode data streams.

SUMMARY OF THE INVENTION

The present invention provides a method and apparatus in a geometry engine having a plurality of stages for processing graphics data. An immediate mode data stream is received at a first stage within the plurality of stages. Data from the immediate mode data stream is stored in a storage to build a vertex data structure for processing within the plurality of stages. The vertex data structure is transmitted to the first stage for processing in response to receiving a signal to transmit the vertex data structure. Data for the vertex data structure remains in the storage as default data for a subsequent vertex data structure.

A subsequent stage within the plurality of stages performs vertex stream assembly for both vertex array data streams and intermediate mode data streams. These two stages allow for handling of intermediate mode data streams without adding large amounts of specialized logic to handle immediate mode data streams.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A and 6B a diagram illustrating a format for fields forming a vertex in accordance with a preferred embodiment of the present invention;

DETAILED DESCRIPTION OF THE PREFERRED EMBODIMENT

Figure 1:
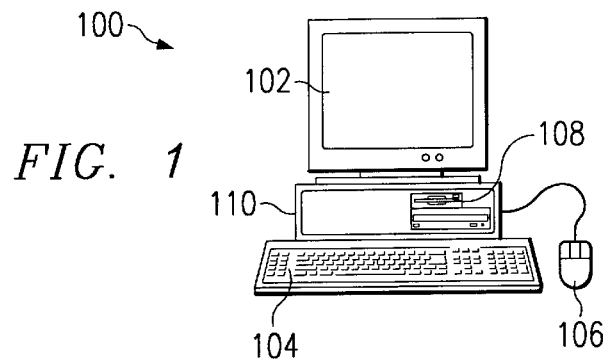
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted, which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of software residing in computer readable media in operation within computer 100.

Figure 2:
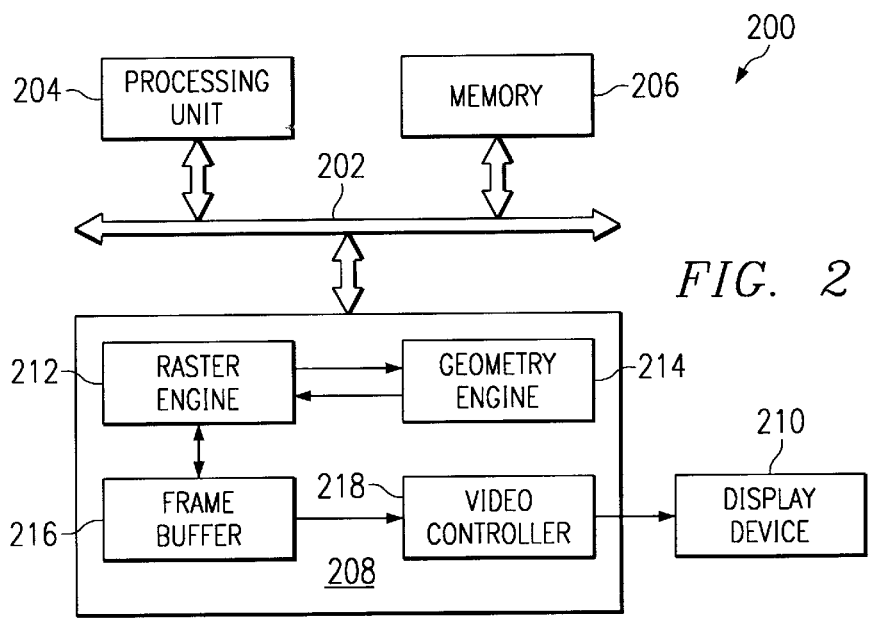
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG. 1. Data processing system 200 employs a bus 202 in the form of a peripheral component interconnect (PCI) local bus architecture. Although the depicted example employs a PCI bus, other bus architectures, such as Accelerated Graphics Port (AGP) and Industry Standard Architecture (ISA), may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214,.a frame buffer 216, and a video controller 218. Raster engine 212 receives the graphics data from the application. In these examples, raster engine 212 contains the hardware and/or software used to rasterize an image for display. Raster engine 212 is used to turn text and images into a matrix of pixels to form a bitmap for display on a screen. In the depicted example, raster engine 212 sends the received graphics data to geometry engine 214, which provides the functions for processing primitives and other graphics data to generate an image for raster engine 212 to process. The processed data is then passed back to raster engine 212. The mechanisms of the present invention are located in geometry engine 214 in these examples.

Frame buffer 216 is an area of memory used to hold a frame of data. Frame buffer 216 is typically used for screen display and is the size of the maximum image area on the screen. Frame buffer 216 forms a separate memory bank on graphics adapter 298 to hold a bitmap image while it is "painted" on a screen. Video controller 218 takes the data in frame buffer 216 and generates a display on display device 210. Typically, video controller 218 will cycle through frame buffer 216 one scan line at a time.

Figure 3:
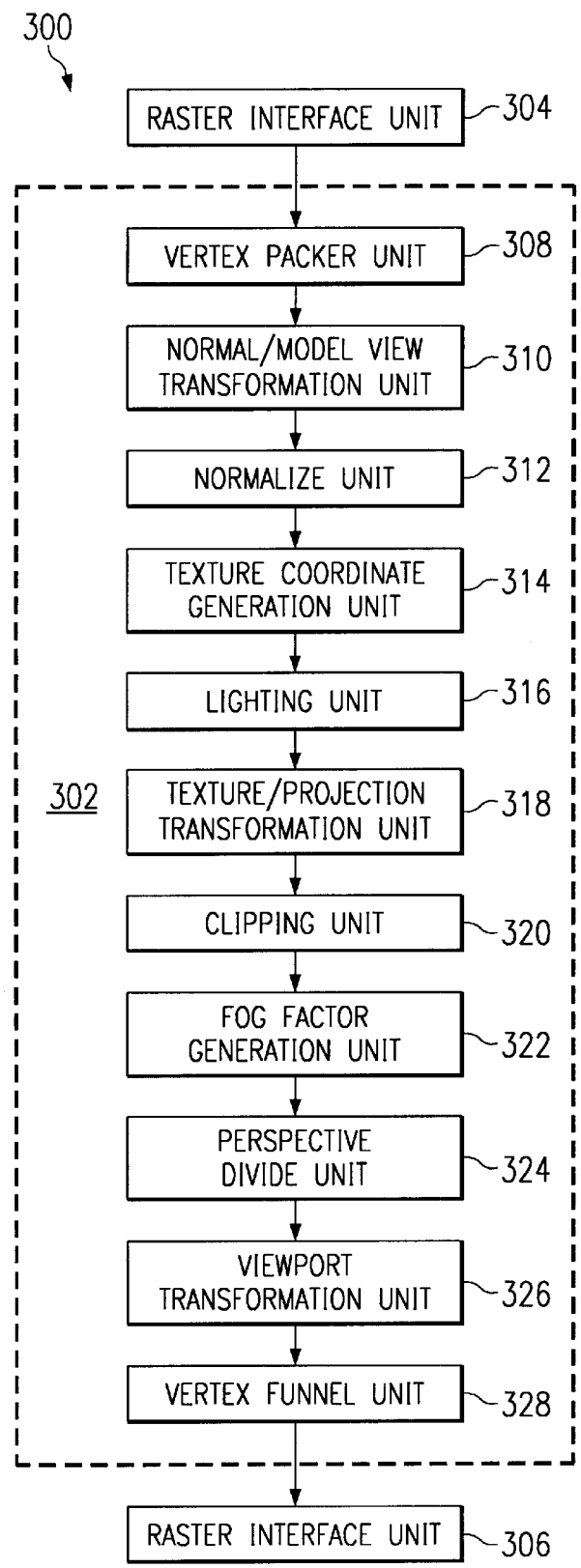
FIG. 3 is a block diagram of a geometry engine in accordance with a preferred embodiment of the present invention.

Turning now to FIG. 3, a block diagram of a geometry engine is depicted in accordance with a preferred embodiment of the present invention. Geometry engine 300, in this example, includes a geometry unit 302, a raster interface unit 304, and a raster interface unit 306. Data is received by raster interface unit 304 for processing within geometry unit 302. The data is received from a raster engine, such as raster engine 212 in FIG. 2. Processed data is returned to the raster engine using raster interface unit 306. The mechanism of the present invention is implemented within the processing elements in geometry unit 302.

Geometry unit 302, in this example, is a graphics pipeline containing a set of processing elements, which include a vertex packer unit 308, a normal/model view transformation unit 310, a normalize unit 312, a texture coordinate generation unit 314, a lighting unit 316, a texture/projection transformation unit 318, a clipping unit 320, a fog factor generation unit 322, a perspective divide unit 324, a viewport transformation unit 326, and a vertex funnel unit 328. These processing elements are also referred to as stages in geometry unit 302.

Vertex packer unit 308 is the top stage of a geometry unit and assembles attribute fields for a vertex. A vertex defines a point, an end point of an edge, or a corner of a polygon where two edges meet. Each vertex contains every possible fragment of data used by any stage in the geometry pipeline. These fragments are data, such as, for example, positional coordinates, colors, normals, and texture coordinates. Normal/model view transformation unit 310 is used to transform object coordinates into the world coordinate system. XYZ vertices, normals, and texture coordinates are transformed before their coordinates are used to produce an image in the frame buffer. This function is performed by transforming the vertices of each polygon with a single transformation matrix that is the concatenation of the individual modeling transformation matrices.

Normalize unit 312 performs normalization function of vertices that have been transformed and places each vertex back into a normal with reference to a single decimal point. In other words, the normalize unit removes any skewing caused by matrix multiplication in normal/model view transformation unit 310. Texture coordinate generation unit 314 generates texture coordinates used for displaying texture for a primitive. Texture coordinate generation unit 314 calculates texture values for each texture coordinate by transforming from one coordinate system into one required for the texture coordinate. Texture coordinates associated with a vertex may either be taken from the current texture coordinates or generated according to a function dependent on vertex coordinates.

Lighting unit 316 computes shading and colors for each vertex. The lighting unit applies lighting models or shading models to a vertex, which may take into account factors, such as ambient light, diffuse reflection, and specular reflection. The shading may be determined using various processes, such as constant, Gouraud, or Phong. Texture/projection transformation unit 318 changes the form or shape of a primitive.

Clipping unit 320 identifies a portion of a primitive lying within a clip region. A clip region is typically either a window on a screen or a view volume. Fog factor generation unit 322 is used to make an object less visible as it is further away from the viewpoint. Typically, mist is generated in front of the object as the object is located further and further away from the viewpoint.

Perspective divide unit 324 is used to generate normalized device coordinates from the incoming coordinates. This unit takes coordinates from fog factor generation unit 322 and divides them by w to generate normalized device coordinates for use by viewpoint transformation unit 326. Viewpoint transformation unit 326 takes primitives in normalized device coordinates and transforms them to window coordinates. Device coordinates are coordinates used by the adapter to display images. Normalized device coordinates are device coordinates that are normalized to between 0 and 1.

Vertex funnel unit 328 takes fragments of vertices and places them on a bus for use by the raster interface unit. In this example, the fragments.are funneled into a 64 bit data word for transfer on the bus.

The stages illustrated in geometry unit 302 are based on operations specified in OpenGL, which is defined in The OpenGL Graphics System: A Specification (Version 1.2). The present invention provides a method and apparatus for handling both vertex array data streams and immediate mode data streams.

Figure 4:
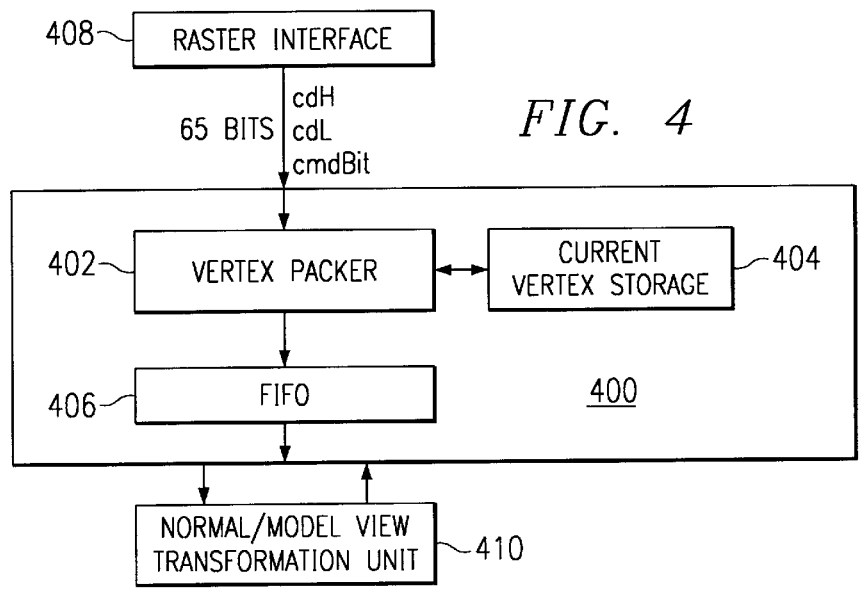
FIG. 4 is a block diagram of a vertex packer in accordance with a preferred embodiment of the present invention.

With reference now to FIG. 4, a block diagram of a vertex packer is depicted in accordance with a preferred embodiment of the present invention. In this example, vertex packer unit 400 is an example of a vertex packer unit, such as vertex packer unit 308 in FIG. 3.

Vertex packer unit 400 includes a vertex packer 402, a current vertex storage 404, and a first-in-first-out (FIFO) 406. Vertex packer 402 will receive data from raster interface 408 and store data in current vertex storage 404. When handling vertex array data streams, vertex packer 402 assembles data for a vertex and transfers the complete vertex to FIFO 406 for transfer to another processing element, such as normal/model view transformation unit 410. When handling vertex array data streams, vertex packer 402 identifies that a complete vertex has been received based on the e-bits set in an e-field word. This word is received with a command word at the beginning of the vertex array data stream.

The mechanism of the present invention allows for a context switch at any time in immediate mode, but only after all vertices in a stream have been processed in vertex array mode. For vertex array mode, the context switch cannot occur in the middle of the stream. For example, if the DRWGE_* command indicated that the stream contains 50 vertices, all 50 vertices must be sent before a context switch can occur. At this point, vertex packer unit 400 has completed processing vertices and shifts back into an idle state. in other words, no context switch is possible while processing vertices for a vertex array mode data stream.

For immediate mode, context switches can occur at any point. The current vertex structure is part of context along with enough state information to know what type of data is being processed so that restarting is possible. For example, each stream of vertices that flows through the graphics pipeline (vertex array mode or immediate mode) has a set of ebits associated with it. For immediate mode, that set of ebits is generated by the vertex packer based on what is enabled in the raster engine. This information also is stored in context so that an immediate mode data stream may be restarted after a context switch. The same amount of data is saved/restored on a context switch regardless of the data stream type.

Figure 5:
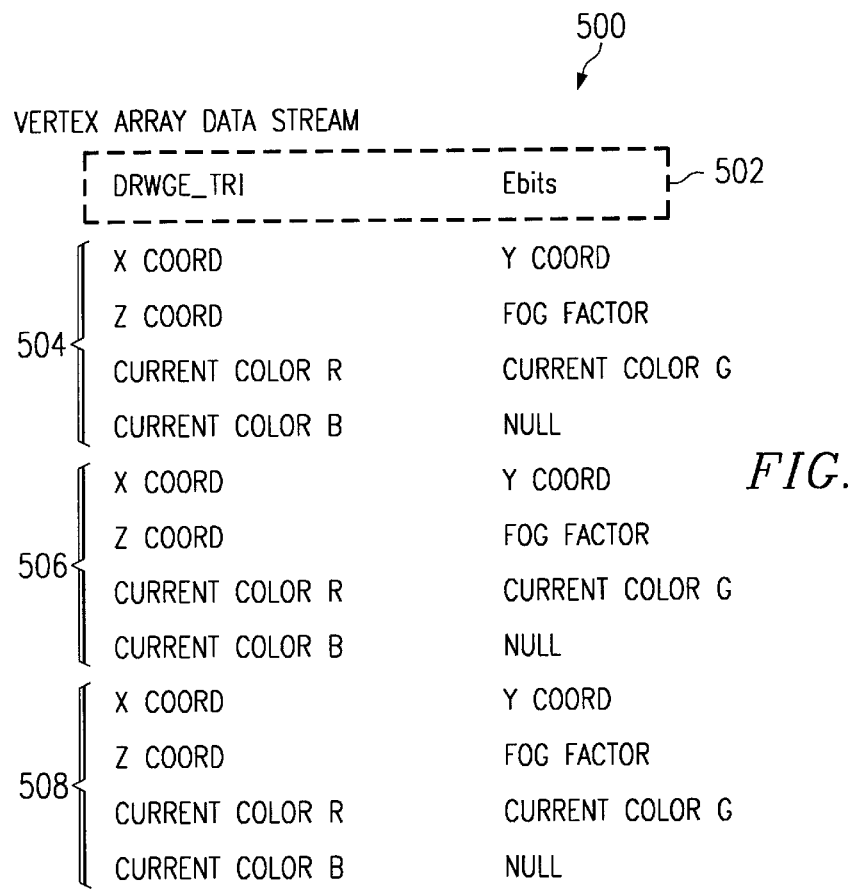
FIG. 5 is a vertex array data stream in accordance with a preferred embodiment of the present invention.

In FIG. 5, a vertex array data stream 500 is illustrated in accordance with a preferred embodiment of the present invention. Section 502 illustrates a command word and an e-field word. These are the first two words received by vertex packer 402 in FIG. 4. The data following these two words also are received two words at a time. In this example, the command indicates that a triangle is to be drawn. Section 504, section 506, and section 508 illustrate the three vertices forming the triangle. As can be seen, each vertex in these sections includes all data for the vertex. Each of these sections is also referred to as a-vertex data structure.

Turning to FIGS. 6A and 6B a diagram illustrating a format for fields forming a vertex is depicted in accordance with a preferred embodiment of the present invention. Table 600 illustrates the different types of words that may be received and processed by vertex packer unit 402 in FIG. 4. Entry 602 illustrates the fields found in a command word. Entry 604 illustrates an e-field word. The entries in section 606 illustrate the type of data that may be found in data words. The command word and the e-field word are the first two words received by the vertex packer unit 308 in FIG. 3. After that, data words are received two words at a time. In this example, the e-field word indicates the number of data words that are to be received for the vertex.

Although a particular format and type of data are illustrated in table 600 for a vertex data stream, this illustration is merely exemplary and not intended as an architectural limitation to the type of data that may be processed by the present invention.

The example in FIG. 5 does not show all the possible data that forms a vertex data-structure, just a small subset. On the other hand, FIGS. 6A and 6B show all the possible data fields for a vertex data structure.

With reference back to FIG. 4, vertex packer unit 400 also is configured to handle the receipt of immediate mode data streams. With immediate mode data streams, the data is not received in the same manner as with vertex array data streams. Instead, received data may pertain to a number of different vertices. The different fields for a vertex are not necessarily specifically specified, for each vertex received by vertex packer unit 400. For example, a parameter, such as a color parameter, may be received with new data for the color parameter being received only when the color parameter changes. This color parameter is valid for all vertices until changed.

When receiving immediate mode data streams, vertex packer unit 400 will convert the immediate mode data stream into a vertex array data stream format for processing by subsequent stages. When information is received in an immediate mode data stream, this information is also placed into current vertex storage 404. When an indication is received that a vertex is to be sent to the next stage, a transfer of data occurs from current vertex storage 404 into FIFO 406. Further, the current vertex data located within current vertex storage 404 remains. If this data is not overwritten by new data received in the immediate data stream, that data located in current vertex storage 404 will be used for the next vertex. If no data has been received or specified for the vertices, then a default value is used.

Figure 7:
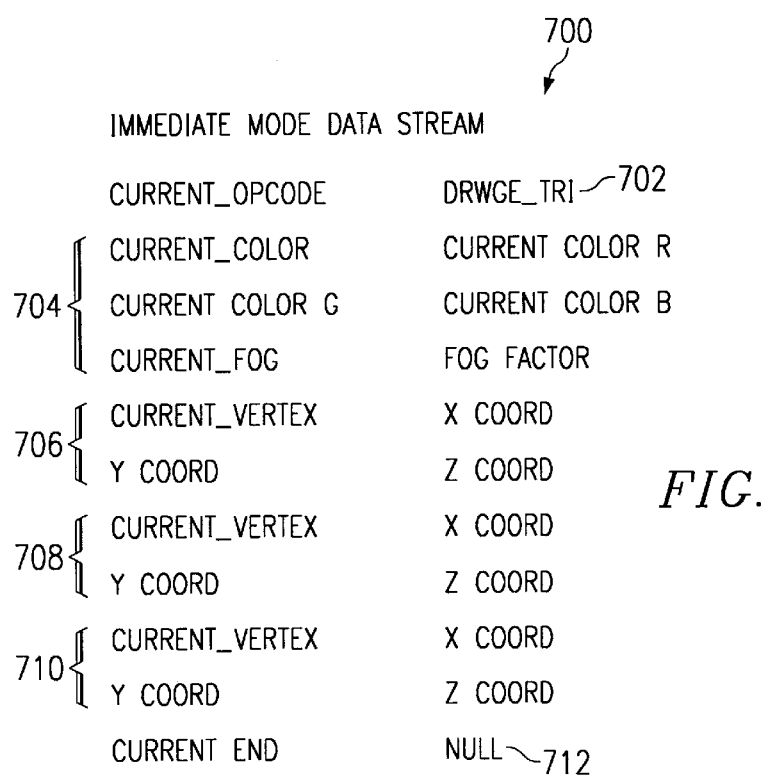
FIG. 7 is an immediate mode data stream in accordance with a preferred embodiment of the present invention.

Next in FIG. 7, an immediate mode data stream is depicted in accordance with a preferred embodiment of the present invention. As with vertex array data stream 500 in FIG. 5, the data for immediate mode data stream 700 is received two words at a time. In the depicted example, data is grouped a facet at a time, but other groupings may be used. Once an immediate mode data stream has started with the CURRENT_OPCODE command, n vertices could follow. In immediate mode data stream 700, data for a single facet is transmitted. The first two words received include a current opcode and a draw command word in section 702 of immediate mode data stream 700. The CURRENT_OPCODE command is analogous to the OpenGL glBegin command. The first word is the command opcode. The second word contains the opcode for the vertex array mode command that is used to draw the facet/primitive in vertex array mode. This opcode is used by the primitive formatter to generate the command word for the rasterizer. By using the same opcode as the vertex array mode command, it allows the clipping stage to only have one command type to decode to identify the type of facet being processed.

As illustrated, parameters, such as those for color and fog shown in section 704, are received only once because these parameters do not change for each of the vertices. Section 706, 708, and 710 illustrate data received for each vertex. The data in the sections of immediate mode data stream 700 include only x, y, and z coordinates. Other parameters for these vertices are in earlier sections of immediate mode data.

As can be seen in immediate mode data stream 700, the parameters for color and fog are not received as each vertex is received. A current end word is received at the end of immediate mode data stream 700. In handling immediate data stream 700, vertex packer unit 400 in FIG. 4 builds a vertex data structure and will release or send a vertex data structure from current vertex data structure storage 404 into FIFO 406 after a current vertex command, CURRENT_VERTEX, is received. Other current commands are used to update the data stored in current vertex storage 404. Thus, for each of the three vertices, the same color and fog factor information will be sent from current vertex 404 into FIFO 406 for each of these vertices.

An advantage provided by handling immediate mode data streams, such as immediate mode data stream 700, is a reduction in the number of total bus transfers required for a particular primitive. Vertex array data stream 500 in FIG. 5 and immediate mode data stream 700 represent data for the same primitive, which is a triangle in this case. Thirteen transfers of 64 bit words are required to send vertex array data stream 500 in FIG. 5 to vertex packer unit 400 in FIG. 4. In contrast, only eleven 64 bit word transfers are required for immediate mode data stream 700. In this example, the use of immediate mode results in two less bus transfers than a vertex data stream mode. In this example, each additional vertex has four bus transfers in the vertex array mode and two bus transfers in the immediate mode. With larger vertex streams, the reduction in bus transfers increase significantly. The data streams illustrated are intended only as examples. Numerous variations are present that can be supported but not shown in these examples.

Figure 8:
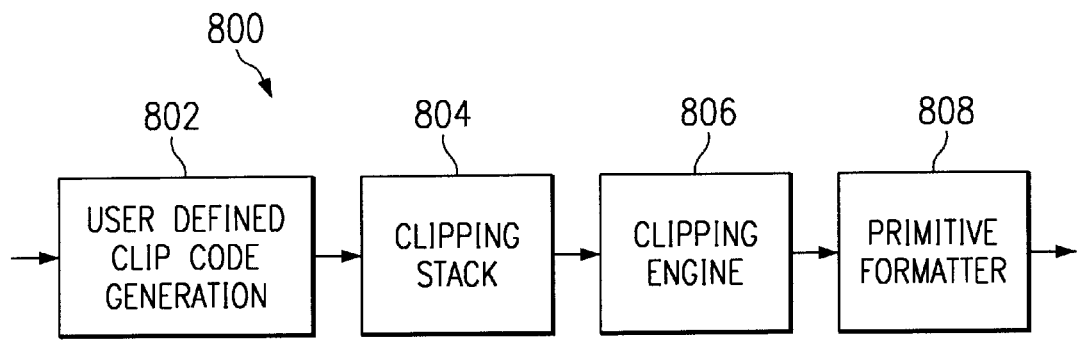
FIG. 8 is a block diagram of a volume clipping stage in accordance with a preferred embodiment of the present invention.

Turning now to FIG. 8, a block diagram of a volume clipping stage is depicted in accordance with a preferred embodiment of the present invention. Volume clipping stage 800 is an example of a processing element that may be implemented as clipping unit 320 in FIG. 3.

Volume clipping stage 800, in this example, includes a user define clip code generation unit 802, a clipping stack unit 804, clipping engine 806, and a primitive formatter 808. Clip code generation unit 802 performs matrix multiplication using the XYZW coordinates and a plane equation provided by the application/user. Clipping stack 804 is used to hold vertices for a facet.

In normal operations, clipping stack 804 receives one vertex at a time and pushes the vertex onto a stack. Once enough vertices have been received to make up a single facet, these vertices are transferred to clipping engine 806. Clipping stack 804 is part of context memory to allow context swapping between immediate mode data streams.

The contents of clipping stack 804 may be saved and restored to allow for context switching. If save/restore operations are not performed with clipping. stack 804, a context switch cannot be performed at an arbitrary point in an immediate mode stream. For a triangle strip, triangles are drawn from v0 to v1 to v2, v1 to v2 to v3, etc. If the contents of clipping stack 804 are not saved/restored, a context swap would not be possible between receiving vertices v2 and v3, since v1 and v2 would be lost. Since immediate mode is open ended, i.e., the number of vertices that will be received is unknown. It is desirable to be able to context swap in the middle of a stream in immediate mode processing. Clipping engine 806 received vertices from clipping stack 804 and performs any necessary clipping on the facet. If nothing is present for clipping, the vertices are trivially accepted, and the vertices are passed to primitive formatter 808.

If clipping is disabled, the vertices for immediate mode processing are treated as in the trivially accepted case. Primitive formatter 808 is used to format the immediate mode into a stream understood by the raster engine. Primitive formatter 808 also will stop and restart vertex streams as necessary when a facet is clipped or a context switch has occurred.

In these examples, clipping stack 804 and primitive formatter 808 handle facets. The application is not required to send the proper number of vertices for a facet. The application may indicate that the application is drawing a triangle and only send two vertices. Clipping stack 804 will filter out such occurances and the partial facet is "dropped".

The vertex stream assembly required for clipping also applies to immediate mode processing. The only difference between immediate mode and vertex array mode is in a begin/end pair. An example of a begin/end pair are begin (glBegin) and end(glEnd). In this example, begin(glBegin) is CURRENT_OPCODE, and end(glEnd) is CURRENT_END.

Figure 9:
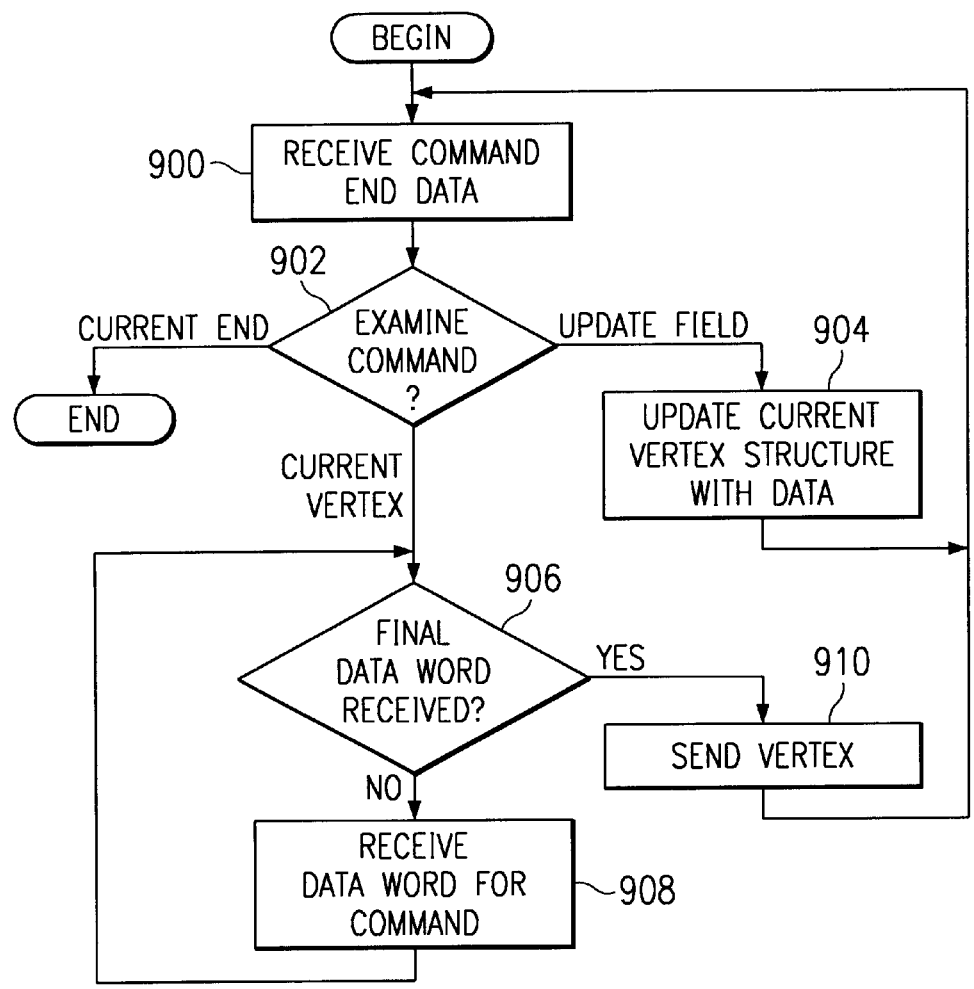
FIG. 9 is a flowchart of a process used in a vertex packer unit to handle an immediate mode data stream in accordance with the preferred embodiment.

Turning now to FIG. 9, a flowchart of a process used in a vertex packer unit to handle an immediate mode data stream is depicted in accordance with a preferred embodiment of the present invention. This process may be implemented in a vertex packer, such as vertex packer unit 400 in FIG. 4. The process begins by receiving a command followed by data (step 900). The command is then examined (step 902). The command determines what is done with the data. If the command indicates a field is to be updated in the current vertex structure, the data structure is updated with the received data (step 904), with the process then returning to step 900.

If the command is a CURRENT_VERTEX command, then a determination is made as to whether the final word of data has been received for this command (step 906). If the final data word for this command has not been received, another data word is received (step 908) with the process then returning to step 906. With reference again to step 906, if the final data word has been received, the current vertex structure is sent to the FIFO (step 910) with the process returning to step 900. With reference again to step 902, if the command is a CURRENT_END command, the process terminates.

Figure 10:
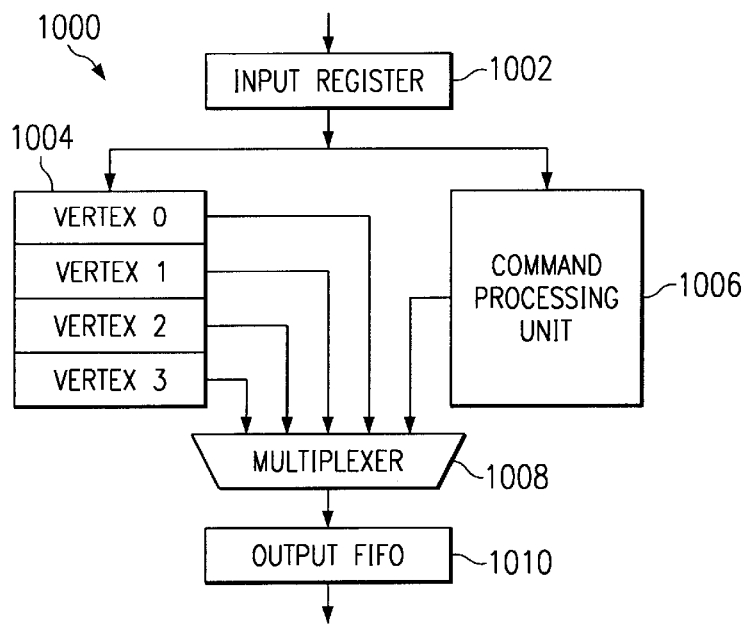
FIG. 10 is a block diagram of a clipping stack in accordance with a preferred embodiment of the present invention.

Turning now to FIG. 10, a block diagram of a clipping stack is depicted in accordance with a preferred embodiment of the present invention. Clipping stack 1000 includes an input register 1002, a vertex stack 1004, a command processing unit 1006, a multiplexer 1008, and an output FIFO 1010. Vertices, commands, and other data are received at input register 1002. Vertices are stored in vertex stack 1004.

This stack holds vertices until enough vertices are present to generate the desired facet. When sufficient vertices are present to form a facet, these vertices are transferred to output FIFO 1010 through multiplexer 1008. The CURRENT_OPCODE or the DRWGE_* command in the data stream indicates what is being drawn, which indicates the number of vertices needed to make up a facet.

Figure 11:
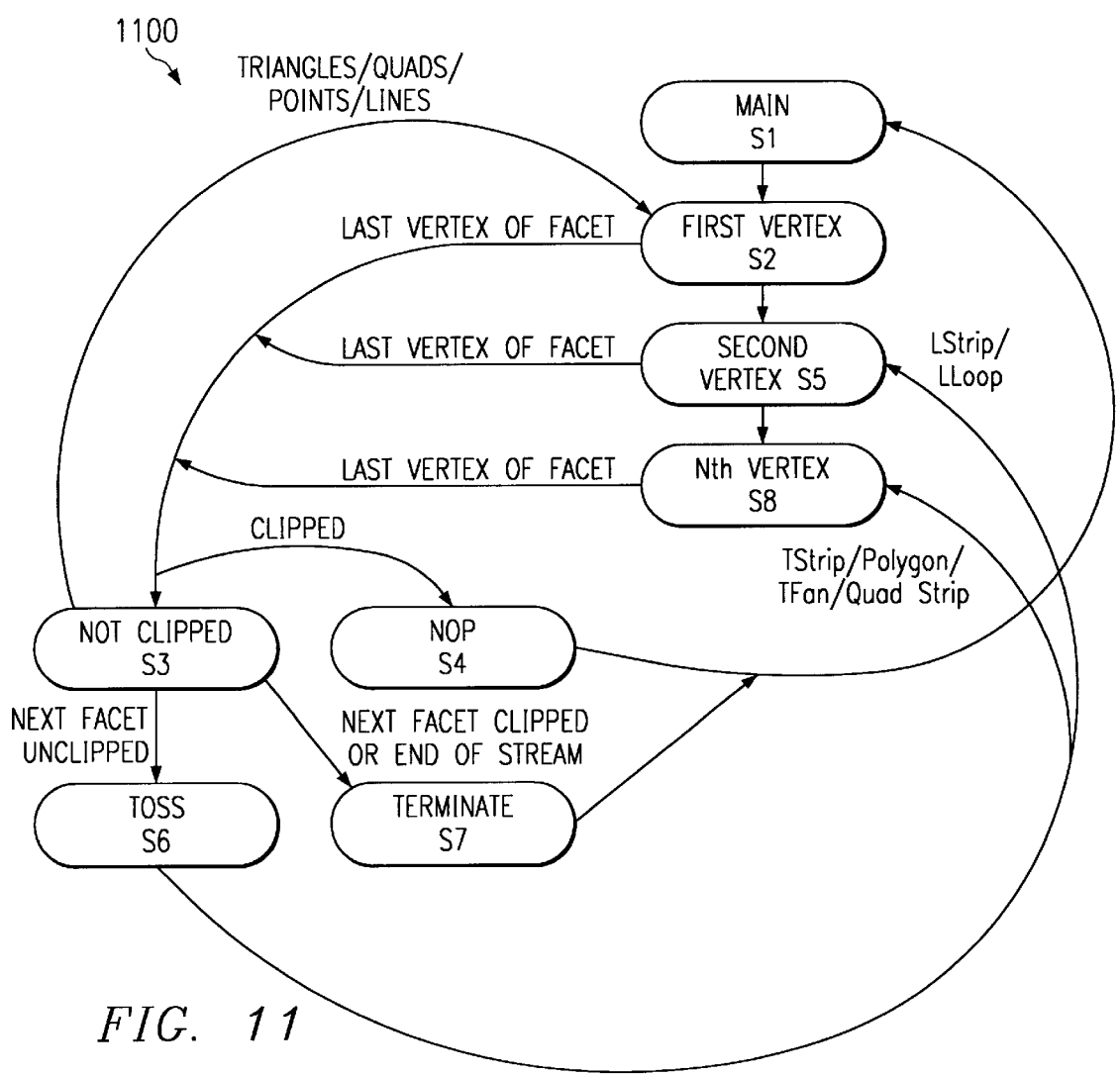
FIG. 11 is a state machine for a primitive formatter in accordance with a preferred embodiment of the present invention.

Turning now to FIG. 11, a state machine for a primitive formatter is depicted in accordance with a preferred embodiment of the present invention.

In this example, state machine 1100 begins in main state S1 in which state machine 1100 waits for a command or generates a command. Commands and vertices are received from a clipping engine, such as clipping engine 806 in FIG. 8.

Main state S1 is the state in which all commands are processed in the primitive formatter. Main state S1 is also the state in which commands pass down from a immediate mode data stream are formatted into a form used by the raster engine. In the depicted examples, the associated data word in the command word data word pair in section 702 of immediate mode data stream 700 in FIG. 7 contains the opcode needed for the raster engine. The opcode is extracted and sent to the raster engine in Main state S1. Upon receiving a command or generating a command, state machine 1100 shifts to First Vertex state S2 if vertices are being processed. State machine 1100 will remain in Main state S1 for processing anything else. When the vertex is received, this vertex is sent to a FIFO if the vertex is the last vertex for the facet. This FIFO provides a connection to a fog factor generation unit, such as fog factor generation unit 322 in FIG. 3. Thereafter, state machine 1100 shifts to either Not Clipped state S3 or No Operation Command (NOP) state S4. Not Clipped state S3 is reached if no clipping occurs while NOP state S4 is reached if clipping occurs.

With reference again to First Vertex state S2, if a facet, such as a line strip or line loop, is to be processed, state machine 1100 will shift into Second Vertex state S5 to wait for and send a second vertex for processing. Upon receipt of the second vertex, this vertex is sent to the FIFO and state machine 1100 shifts to either Not Clipped state S3 or NOP state S4 depending on whether clipping occurs. If the facet is clipped, state machine 1100 shifts into an NOP state S4. In NOP state S4, a no operation command is sent to the raster engine with state machine 1100 then returning to Main state S1. The no operation command is a command that does not cause the raster engine to perform any operation or function. This command merely tells the raster engine that the end of the data stream for the facet has been reached.

If the facet is not clipped, state machine 1100 shifts from Second Vertex state S5 to Not Clipped state, S3. From this state if the next facet is unclipped, state machine 1100 then shifts to Toss State S6 only if it is a line strip, line loop, triangle strip, triangle fan, polygon, or quad strip. These primitive types are the only primitive types that have common vertices. For independent lines, triangles, or quads state machine 1100 transitions from Not Clipped state S3 back to First Vertex state S2. From Toss state S6, state machine 1100 transitions to Nth Vertex state S8 when triangle strips, triangle fans, polygons, or quad strips are present. State machine 1100 transitions to Second Vertex state S5 when line strips and line loops are present. A transition from Not Clipped state S3 to Toss state S6 does not occur for independent triangles, quads, or lines in these examples.

Toss state S6 results in the tossing or discarding of a common vertex between this facet and the next facet. For example, if two facets are present in which a first facet contains a vertex V1 and a vertex V2, and a second facet contains vertex V2 and a vertex V3, the primitive formatter will not resendivertex V2 a second time. The primitive formatter, however, does receive vertex V2 twice because it receives data one facet at a time from the clipping engine. The second time vertex V2 is received it is discarded with state machine 1100 then shifting back to Second Vertex state S5 when the facet is a two vertex facet, such as a line strip or a loop.

With reference again to Not Clipped state S3, if the next facet is clipped or the end of the stream is reached, state machine 1100 then shifts to Terminate state S7. In this state, a no opcode similar to that sent in NOP state S4 is sent to the raster engine with state machine 1100 then returning to Main state S1.

With reference back to Second Vertex state S5, if the facet contains three or four vertices, the state machine 1100 will shift from second vertex state S5 to Nth Vertex state S8 to send the third and possibly a fourth vertex to the FIFO. This state is reached when facets such as a triangle, a triangle strip (Tsrip), a polygon, a triangle fan (Tfan), a quad, or a quad strip are to be displayed. State machine 1100 will loop back to Nth Vertex state S8 while waiting to receive a fourth vertex for a quad or a quad strip. After the third and possibly fourth vertex is received and sent to the FIFO, state machine 1100 will shift to Not Clipped state S3 or NOP state S4 as discussed above.

Thus, the present invention provides a method and apparatus for handling immediate mode data streams as well as vertex array data streams. The fields of a vertex are gathered and stored in a manner to allow context switching between different applications. This context switching is enabled through gathering vertices on a stack and releasing the vertices only when a complete primitive is available for rendering. Using the mechanism of the present invention, context switching is possible for immediate mode because the entire stack is part of context. Through the mechanism of the present invention, immediate mode data streams can be handled by the geometry engine. This ability to handle immediate mode data streams reduces the size of the data stream transferred to the graphics adaptor as compared to vertex array data streams. The reduction in the amount of data transferred across a bus to the graphics adaptor results in higher performance. Further, the mechanism of the present invention does not require additional processing elements or stages to be added to the geometry engine. Instead, already present processing elements are configured to handle both data streams. In these examples, the functions are implemented in a vertex packer unit and a clipping unit in which the vertex packer unit is used to build a vertex data structure when processing both immediate mode data streams and vertex array data streams. The clipping unit is used to perform vertex stream assembly for both immediate mode data streams and vertex array data streams.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted examples illustrate the mechanisms of the present invention being implemented in a vertex packer unit and in a clipping unit, these processes may be implemented in other types of processing elements or stages depending on the particular architecture of the particular pipeline. Further, although an opcode is extracted and sent to the raster engine by the primitive formatter, other mechanisms may be used. For example, if a one to one correspondence cannot be found, a translation of commands may be made using a lookup table. The embodiment was chosen and described in order to best explain the principles of the invention, the practical application, and to enable others of ordinary skill in the art to understand the invention for various embodiments with various modifications as are suited to the particular use contemplated.

What is claimed is:

1. A graphics pipeline comprising:
   an input, wherein the input receives graphics data streams;
   an output, wherein the output transmits processed graphics data;
   a plurality of stages, wherein the plurality of stages processes a vertex data structure, wherein the plurality of stages generates the processed graphics data and wherein a last stage within the plurality of stages is connected to the output; and
   a receiving stage providing a connection between the input and a first stage within the plurality of stages, wherein the receiving stage includes a plurality of modes of operation including:
   a first mode of operation, responsive to receiving an immediate mode data stream, in which the first stage stores data from the immediate mode data stream in a storage to build the vertex data structure for processing within the plurality of stages; and
   a second mode of operation, responsive to receiving a signal to transmit the vertex data structure, in which the receiving stage transmits the vertex data structure to the first stage for processing, wherein data for the vertex data structure remains in the storage as default data for a subsequent vertex data structure.

2. The graphics pipeline of claim 1, wherein the receiving stage further includes:
   a third mode of operation, responsive to receiving a vertex array data stream containing a set of vertices, in which the first stage receives a complete vertex data structure for each vertex in the vertex array data stream; and
   a fourth mode of operation, responsive to receiving the complete vertex array data structure, the receiving stage transmits the complete vertex array data structure to the first stage.

3. The graphics pipeline of claim 1, wherein the receiving stage is a vertex packer unit.

4. The graphics pipeline of claim 1, wherein the plurality of stages includes at least one of a normal/model view transformation unit, a texture coordinate generation unit, a lighting unit, a texture/projection transformation unit, a clipping unit, a fog factor generation unit, a perspective divide unit, and a viewport transformation unit.

5. The graphics pipeline of claim 1, wherein the immediate mode data stream includes a set of vertices forming a facet, wherein the plurality of stages includes a clipping stage, and wherein the clipping stage holds vertices until a complete facet is received and transmits the complete facet for display.

6. The graphics pipeline of claim 1, wherein the complete facet includes at least two vertices.

7. The graphics pipeline of claim 1, wherein the input is a raster interface.

8. A graphics adapter comprising:
   an input configured to receive graphics data;
   a frame buffer, wherein processed graphics data is stored for display;
   a raster engine connected to the input and to the frame buffer, wherein the raster engine rasterizes the processed graphics data for display; and
   a geometry engine connected to the raster engine, wherein the geometry engine receives the graphics data from the raster engine, processes the graphics data to form the processed graphics data, and returns the processed graphics data to the raster engine and wherein the geometry engine includes a set of processing elements in which a first processing element within the set of processing elements receives an immediate mode data stream, stores data from the immediate mode data stream in a storage to build a vertex data structure, transmits the vertex data structure to a subsequent processing element within the set of processing elements in response to receiving a selected command to transmit the vertex data structure, wherein data for the vertex data structure remains in the storage as default data for a subsequent vertex data structure.

9. The graphics adapter of claim 8, wherein the first processing element is a vertex packer unit.

10. The graphics adapter of claim 8, wherein the set of processing elements includes at least one of a normal/model view transformation unit, a texture coordinate generation unit, a lighting unit, a texture/projection transformation unit, a clipping unit, a fog factor generation unit, a perspective divide unit, and a viewport transformation unit.

11. The graphics adapter of claim 8, wherein the immediate mode data stream includes a set of vertices forming a facet, wherein the set of processing elements includes a clipping stage, and wherein the clipping stage holds vertices until a complete facet is received and transmits the complete facet.

12. The graphics adapter of claim 11, wherein the set of vertices form additional facets.

13. The graphics adapter of claim 11, wherein the complete facet is transmitted to a rasterizer.

14. A method in a geometry engine having a plurality of stages for processing graphics data, the method comprising:
   receiving an immediate mode data stream at a first stage within the plurality of stages;
   storing data from the immediate mode data stream in a storage to build a vertex data structure for processing within the plurality of stages; and
   transmitting the vertex data structure to the first stage for processing in response to receiving a signal to transmit the vertex data structure, wherein data for the vertex data structure remains in the storage as default data for a subsequent vertex data structure.

15. The method of claim 14, wherein the signal is a current vertex command.

16. The method of claim 14 further comprising:

receiving vertex data structures for display;

holding the vertex data structures until a complete facet is received; and transmitting the complete facet when all vertex data structures forming the complete facet are received.

17. The method of claim 14, wherein the receiving step is performed in a vertex packer unit.

18. The method of claim 14, wherein the holding and transmitting steps are performed in a clipping stack unit.

19. The method claim 14, wherein the first stage also processes vertex array data streams using the storage.

20. A method of claim 14 further comprising:

receiving new data for the subsequent vertex data structure to build the subsequent vertex data structure, wherein the default data is used for any data that is unreceived with the new data.

21. A geometry engine having a plurality of stages for processing graphics data, the geometry engine comprising;

receiving means for receiving an immediate mode data stream at a first stage within the plurality of stages;

storing means for storing data from the immediate mode data stream in a storage to build a vertex data structure for processing within the plurality of stages; and transmitting means for transmitting the vertex data structure to the first stage for processing in response to receiving a signal to transmit the vertex data structure, wherein data for the vertex data structure remains in the storage as default data for a subsequent vertex data structure.

22. The geometry engine of claim 21, wherein the signal is a current vertex command.

23. The geometry engine of claim 21 further comprising:

receiving means for receiving vertex data structures for display;

holding means for holding the vertex data structures until a complete facet is received; and transmitting means for transmitting the complete facet when all vertex data structures forming the complete facet are received.

24. The geometry engine of claim 21, wherein the receiving means is located in a vertex packer unit.

25. The geometry engine of claim 21, wherein the holding means and transmitting means are located in a clipping stack unit.

26. The geometry engine claim 21, wherein the first stage also processes vertex array data streams using the storage.

27. A computer program product in a computer readable medium having a plurality of stages for processing graphics data, the computer program product comprising:

first instructions for receiving an immediate mode data stream at a first stage within the plurality of stages;

second instructions for storing data from the immediate mode data stream in a storage to build a vertex data structure for processing within the plurality of stages; and third instructions for transmitting the vertex data structure to the first stage for processing in response to receiving a signal to transmit the vertex data structure, wherein data for the vertex data structure remains in the storage as default data for a subsequent vertex data structure.

* * * * *